United States Patent [19]
McDaniel et al.

[11] Patent Number: 5,221,654
[45] Date of Patent: Jun. 22, 1993

[54] FLUORIDED ALUMINAS, CATALYSTS, AND POLYMERIZATION PROCESSES

[75] Inventors: Max P. McDaniel, Bartlesville, Okla.; Douglas D. Klendworth, Westchester, Ohio; Marvin M. Johnson, Bartlesville, Okla.

[73] Assignee: Phillips Petroleum Company, Bartlesville, Okla.

[21] Appl. No.: 930,961

[22] Filed: Aug. 14, 1992

Related U.S. Application Data

[62] Division of Ser. No. 637,897, Jan. 2, 1991, Pat. No. 5,171,798.

[51] Int. Cl.⁵ .......................................... B01J 27/132
[52] U.S. Cl. .................................... 502/228; 502/231; 502/320; 502/355; 526/154
[58] Field of Search ............... 502/228, 231, 320, 355; 526/99, 106, 154

[56] References Cited

U.S. PATENT DOCUMENTS

| | | | |
|---|---|---|---|
| 2,860,127 | 11/1958 | Banks | 260/94.9 |
| 2,951,816 | 9/1960 | Hogan et al. | 252/467 |
| 3,887,494 | 6/1975 | Dietz | 252/452 |
| 4,011,382 | 3/1977 | Levine | 526/96 |
| 4,130,505 | 12/1978 | Nasser et al. | 252/432 |
| 4,596,862 | 6/1986 | McDaniel et al. | 526/106 |
| 4,659,690 | 4/1987 | McDaniel et al. | 502/439 |
| 4,681,869 | 7/1987 | Kukes et al. | 502/349 |
| 4,788,171 | 11/1988 | Klendworth | 526/106 |
| 4,806,513 | 2/1989 | McDaniel et al. | 506/106 |

*Primary Examiner*—Joseph L. Schofer
*Assistant Examiner*—David Wu
*Attorney, Agent, or Firm*—Lynda S. Jolly

[57] ABSTRACT

High surface are aluminas are pre-calcined to form gamma-alumina. In one embodiment, the gamma-alumina is treated with an anhydrous solution of a fluorine-containing compound. In a second embodiment, alumina is precipitated in the pores of the gamma-alumina and then treated with a fluorine-containing compound. In a third embodiment a cogel of aluminum trifluoride and aluminum hydroxide is prepared. The three inventive fluorided alumina supports can be impregnated with a transition metal, preferably chromium, to form a catalyst system which can be used to polymerize mono-1-olefins.

17 Claims, No Drawings

FLUORIDED ALUMINAS, CATALYSTS, AND POLYMERIZATION PROCESSES

This application is a division of application Ser. No. 07/637,897, filed Jan. 2, 1991, now U.S. Pat. No. 5,171,798 the entirety of which is herein incorporated by reference and now allowed.

BACKGROUND OF THE INVENTION

This invention relates to treated alumina.

Supported chromium oxide catalysts have long been used to prepare olefin polymers to give products having excellent characteristics from many standpoints. A number of supports have long been broadly disclosed in the art for chromium oxide catalysts including silica, alumina, thoria, zirconia, silica-alumina, and other refractory materials. However, as a practical matter only predominately silica supports have achieved substantial commercial success. Alumina, which is almost always included in the prior art in the list of suitable supports, while operable, invariably causes productivity to be extremely low. The preferred prior art support, silica, also suffers from disadvantages among which is the inability to produce ultra high molecular weight polymer using hexavalent chromium.

SUMMARY OF THE INVENTION

It is an object of this invention to provide an improved catalyst support.

It is another object of this invention to provide an improved alumina, which can be used as a catalyst support.

It is a further object of this invention to provide an improved polymerization catalyst.

It is yet another object of this invention to provide a chromium catalyst capable of giving high productivity.

It is yet a further object of this invention to provide an improved olefin polymerization process.

It is yet a further object of this invention to provide an improved process for preparing supported chromium olefin polymerization catalysts.

In accordance with one embodiment of this invention a fluorided alumina is prepared by calcining a large pore, high surface area alumina to form a calcined gamma-alumina and contacting the calcined gamma-alumina with an anhydrous solution of a fluorine-containing compound.

In accordance with a second embodiment of this invention, an alumina-in-gamma-alumina is prepared by calcining a large surface area alumina to form a calcined gamma-alumina; contacting the calcined gamma-alumina with a sufficient amount of a solution of an aluminum compound up to incipient wetness; contacting the incipiently wet product with an alumina precipitating compound to form a precipitated alumina in the calcined gamma-alumina; removing any residual solution of aluminum compound and any residual aluminum precipitating compound from the precipitated alumina in the calcined gamma-alumina; and drying the resultant compound. While not wishing to be bound by theory, it is believed that the resultant composition comprises boehmite alumina in calcined gamma-alumina, i.e., alumina-in-gamma-alumina. This alumina-in-gamma-alumina composition can then be impregnated with a fluorine-containing compound to form another type of fluorided alumina.

In accordance with yet a third embodiment of this invention, an alumina cogel can be prepared by dissolving a fluorine-containing compound with a base; neutralizing that solution by mixing it with a water-soluble aluminum salt solution to form a hydrated aluminum oxy-fluoride cogel, $(AlF_3) \cdot x(Al_2O_3)$.

Any of the three above-mentioned fluorided aluminas can be used as a catalyst support for a transition metal, preferably chromium, to form a catalyst system useful to polymerize mono-1-olefins.

DESCRIPTION OF THE PREFERRED EMBODIMENTS

Supports

The support of the catalyst of this invention is a fluorided alumina-containing material. As used in this disclosure, the term "support" refers to a carrier for another catalytic component. However, a support is not necessarily an inert material; a support can contribute to catalytic activity and/or catalytic productivity. Furthermore, a support can have an effect on the properties of the resultant polymer produced.

The starting material is an alumina-containing material which can contain other ingredients which are present to produce some unrelated result and/or which do not adversely affect the quality of the final catalyst. For example, other metal oxides, such as boria, magnesia, silica, thoria, titania, zirconia, and mixtures thereof, can be present without adverse affects. Preferably, the support is at least 75 weight percent alumina and preferably 85 weight percent alumina, based on the weight of the alumina-containing material, in order to achieve optimum catalyst quality, as well as improved polymer characteristics. Usually, the starting alumina will comprise some silica.

The starting alumina-containing material, hereinafter also referred to as "alumina" or "base alumina", must be a high surface area, large pore volume alumina and must be calcined prior to use. Usually, the surface area of the starting alumina, after one hour of calcination at 600° C., will be greater than about 200 square meters per gram ($m^2/g$) and preferably within the range of about 200 to about 600 $m^2/g$. Most preferably, the starting alumina will have a surface area within the range of about 250 to about 500 $m^2/g$ for easier fluoride and catalyst loading, improved productivity, and greater durability. Usually, the pore volume of the starting alumina will be greater than 0.5 milliliters per gram (ml/g) and preferably within the range of about 0.5 to about 2.5 ml/g. Most preferably, the starting alumina will have a pore volume within the range of about 1 to about 2 ml/g for greater durability.

Exemplary starting aluminas are commercially available. Preferred commercially available base aluminas are commonly referred to as Ketjen B or Ketjen L. Typical Ketjen B or Ketjen L aluminas, as used in the present invention, will have typical analyses as given in Table I, below.

TABLE I

| | Ketjen B | Ketjen L |
|---|---|---|
| Loss on ignition (1 hr., 1000° C., wt. % wet base) | 25 | 25 |
| Chemical Composition (wt. % dry base) | | |
| Alumina, $Al_2O_3$ | Balance | Balance |
| Sodium oxide, $Na_2O$ | 0.1 | 0.15 |

TABLE I-continued

|  | Ketjen B | Ketjen L |
|---|---|---|
| Sulfate, SO$_4$ | 1.5 | 2.0 |
| Silicon dioxide, SiO$_2$ | 1.0 | 5.0 |
| Iron, Fe | 0.03 | 0.03 |
| Physical Properties | | |
| Surface Area, m$^2$/g (1 hr., 600° C.) | 340 | 380 |
| Apparent bulk density, g/ml | 0.3 | 0.3 |
| Pore Size Distribution (radius) | | |
| <37.5Å, ml/g | 0.20 | 0.20 |
| 37.5–100Å, ml/g | 0.18 | 0.18 |
| 100–1000Å, ml/g | 0.74 | 0.74 |
| 1000–10,000Å, ml/g | 0.51 | 0.71 |
| 10,000–75,000Å, ml/g | 0.15 | 0.17 |
| Total pore volume, ml/g | 1.78 | 2.00 |
| Particle Size Distribution (% wt.) | | |
| −149 micron | 98 | 95 |
| −105 micron | 65 | 60 |
| −74 micron | 39 | 30 |
| −40 micron | 19 | 15 |
| Average particle size, micron | 85 | 95 |

Prior to treatment with, or contacting, a fluoriding agent, the alumina must be calcined. As used in this disclosure, the terms "gamma-alumina", "calcined alumina", and "calcined, gamma-alumina" are used interchangeably and refer to the calcined base alumina, described above. The alumina is calcined under conditions of temperature and time sufficient to convert substantially all of the alumina to gamma-alumina and to remove substantially all water. Generally, temperatures within the range of about 300° to about 900° C., for times within a range of about 1 minute to about 48 hours are sufficient. Temperatures under about 300° C. and times of less than about 1 minute can be insufficient to convert substantially all of the alumina to gamma-alumina. Temperatures of greater than about 900° C. and times of greater than about 48 hours do not convert a significantly greater portion of the alumina to gamma-alumina. Preferably, temperatures within the range of about 500° to about 800° C. and times within the range of about 30 minutes to about 24 hours are employed. Most preferably, temperatures within the range of about 500° to about 700° C. and times within the range of about 1 hour to about 6 hours are employed. The calcining can be carried out under an oxidizing, reducing, or inert atmosphere; the principal purpose of the atmosphere is to sweep away moisture.

The term "fluorided" is meant to describe an alumina support treated with a fluorine-containing compound as described herein. The terms "fluoride treatment" and "fluoriding" are meant to refer broadly to the fluorine, i.e., fluorine-containing compound, or fluoriding agent. Reaction of the fluorine-containing compound with an alumina support can take place on impregnation or an activation. Any organic or inorganic fluorine-containing compound which can provide fluoride can be used in this invention. Exemplary fluorine-containing compounds include, but are not limited to, ammonium bifluoride(NH$_4$HF$_2$), ammonium fluoroborate (NH$_4$BF$_4$), ammonium silicofluoride ((NH$_4$)$_2$SiF$_6$), and mixtures thereof. The most preferred fluorine-containing compound is ammonium bifluoride, due to ease of use and availability. While not wishing to be bound by theory, it is believed that the fluoride in inorganic fluorine-containing compounds, which can provide free fluoride in solution, attaches to the gamma-alumina in solution. It is also believed that the fluoride inorganic fluorine-containing compounds does not attach to the gamma-alumina in solution, but can attach to the gamma-alumina upon catalyst system activation.

In accordance with one embodiment of the invention, the fluoriding treatment must be done with a substantially anhydrous fluorine-containing compound, since the base alumina has been calcined and substantially all water has been removed from the alumina. The calcined, gamma-alumina and the fluorine-containing compound can be contacted according to any method known in the art. For ease of preparation, an anhydrous fluorine-containing compound can be prepared, or dissolved, with any anhydrous liquid, preferably an anhydrous alcohol. Most preferably, the anhydrous liquid is an alcohol with from about 1 to about 3 carbon atoms per molecule for better solubility of the fluoriding-agent. If the fluorine-containing compound is dissolved in an anhydrous liquid, the alumina can be mixed, or slurried, with the anhydrous fluorine-containing compound solution.

Sufficient fluorine-containing compound is combined with the alumina in order to achieve from about 4 to about 14 weight percent fluoride, preferably from about 4 to about 10 weight percent fluoride, based on the weight of the calcined alumina used. Most preferably, the fluorine loading is within the range of from about 5 to about 9 weight percent fluorine, for best catalyst system activity and productivity.

After addition of the fluorine-containing compound to the alumina, a chromium compound can be added to the support. The support can be dried, i.e., removal of substantially all liquid, prior to chromium addition, but drying is not essential. In accordance with this first embodiment, however, it is sometimes useful that the fluorine-containing compound be added to the alumina prior to, and not simultaneously with or subsequent to, the addition of a chromium compound. Some fluorine-containing compounds can precipitate the chromium if a fluorine-containing compound is added simultaneously with a chromium compound. Furthermore, while not wishing to be bound by theory, it is believed that the fluorine-containing compound has a greater affinity to alumina if a fluorine-containing compound is added prior to the chromium compound.

In accordance with a second embodiment of this invention, the fluoriding treatment is done with an alumina-treated-alumina or an alumina precipitated in gamma-alumina compound. As with the first embodiment, a base alumina must be calcined to convert the base alumina to gamma-alumina prior to any subsequent treatment. These calcining conditions are the same as those previously described for the first embodiment of the invention.

The calcined gamma-alumina is then treated with an aqueous solution of aluminum ions. Any aluminum compound soluble in water can be used. For ease of use and availability, the most preferred aluminum compounds include aluminum nitrate (Al(NO$_3$)), aluminum sulfate (Al$_2$(SO$_4$)$_3$), aluminum chloride (AlCl$_3$), and mixtures thereof. A concentrated aqueous solution of aluminum ions is added to the calcined gamma-alumina and adsorbed into the pores of the calcined gamma-alumina. A sufficient amount of aqueous aluminum solution is added to be equal to or less than incipient wetness. The concentration of the aqueous aluminum solution can be any concentration such that about 1 to about 25 weight percent aluminum, based on the weight of the calcined gamma-alumina, is adsorbed or deposited into the pores of the calcined gamma-alumina. Preferably, about 1 to about 20 weight percent aluminum, and must preferably, about 2 to about 15 weight percent aluminum is deposited into the pores of the calcined gamma-alumina.

After the aqueous aluminum impregnation of the gamma-alumina compound, any basic compound which can provide hydroxyl (OH$^-$) groups to precipitate the aluminum ions is added. Preferably, for compatibility and ease of use, an aqueous solution of a basic compound is used. For ease of use and availability, the preferred basic compound is ammonium hydroxide (NH$_4$OH). Any amount of basic compound can be added which is sufficient to precipitate the aluminum ions. Thus, lesser quantities of a concentrated basic solution or greater quantities of a dilute basic solution can be used. An excess of basic compound usually is not detrimental to the final support and catalyst system in that any excess can be subsequently removed.

After sufficient basic compound is added to precipitate the desired amount of alumina into the pores of the gamma-alumina, excess aluminum ions and/or excess basic compound(s) can be removed by any method known in the art. Usually, for ease of use, excess aluminum ions and/or excess basic compound(s) can be removed by washing the resultant product. Preferably, for compatibility and safety, the wash solution is water.

Upon completion of the water wash, the support, which now comprises alumina-precipitated-in-gamma-alumina is washed in an organic liquid of low surface tension such as, for example, an alcohol, and is dried to remove substantially all liquid. The drying can be performed in any manner known in the art which does not collapse the support. Preferably, drying is done under a vacuum, at temperatures within the range of from about 70° to about 90° C. in order to best maintain pore integrity. While not wishing to be bound by theory, it is believed that drying the alumina-in-gamma-alumina composition at relatively low temperatures, the precipitated alumina is boehmite alumina, and not gamma-alumina. Thus, the alumina-precipitated-in-alumina compound comprises boehmite alumina within the pores of gamma-alumina.

The alumina-in-gamma-alumina composition can be used as a catalyst support. Preferably, the composition can be further treated with a fluorine-containing compound in any manner known in the art, as disclosed in the first embodiment. Preferably, a fluorine-containing compound is dissolved in an anhydrous liquid, and then this anhydrous solution of the fluorine-containing compound is contacted with the alumina-in-gamma-alumina support. The amount of fluorine-containing compound employed in the second embodiment is the same as that in the first embodiment of the invention. Finally, the resultant support, either wet or dry, can be contacted with a chromium compound.

Although not wishing to be bound by theory, it is believed that the effectiveness of the second embodiment comes from the following explanation. The support matrix is first calcined at high temperatures, which converts boehmite to gamma-alumina and makes the alumina more resistant to attack by fluoride. Onto this "hard" framework is deposited a "soft" layer of aluminum hydroxide (Al(OH)$_3$), which is converted to boehmite alumina. Fluoride later tends to preferentially attack the "soft" layer, which puts more fluoride onto the surface without damaging the support structure.

A third embodiment of this invention can be defined as a cogel of aluminum trifluoride (AlF$_3$) and aluminum hydroxide. Preparation of the aluminum trifluoride can be done by dissolving any fluorine-containing compound with, or in, a base. Due to ease of use and safety, ammonium bifluoride (NH$_4$HF$_2$), the most preferred fluorine-containing compound, can be dissolved in ammonium hydroxide (NH$_4$OH). The basic fluorine-containing compound solution is then mixed with a water soluble aluminum compound to neutralize the two solutions to form an aluminum trifluoride/aluminum hydroxide cogel, also referred to as an aluminum-oxy-fluoride cogel. The aluminum-oxy-fluoride, or aluminum-hydroxide-fluoride, cogel can then be combined with a chromium compound or can be calcined to convert the alumina to gamma-alumina, resulting in a complex with a generic representation as AlF$_3$xAl$_2$O$_3$, wherein x can be any fraction or number greater than zero. After chromium addition, the catalyst system must be activated, as described in this disclosure.

Usually, the AlF$_3$.xAl$_2$O$_3$ complex will comprise less than about 75 weight percent AlF$_3$, calculated as AlF$_3$, and preferably less than about 60 weight percent AlF$_3$. Most preferably, the AlF$_3$.xAl$_2$O$_3$ will comprise from about 10 to about 50 weight percent AlF$_3$ calculated as AlF$_3$, for best support physical characteristics, as well as best resultant catalyst system productivity.

While not wishing to be bound by theory, it is believed the third embodiment is best represented by a generic representation of AlF$_3$.xAl$_2$O$_3$. However, generic representation can be some type of matrix, or network, of aluminum and fluoride, or fluorine. Usually, the mole ratio of fluorine to aluminum (F:Al) is less than about 2:1, preferably, less than about 1.5:1. Most preferably, the mole ratio of fluorine to aluminum is within the range of 0.1:1 to 1.2:1 for reasons given above.

The order of addition of this third inventive embodiment is extremely important. The fluorine-containing compound must be combined with a basic compound prior to, i.e., before, the addition of a water soluble aluminum compound. If the water soluble aluminum compound is combined directly with a fluorine-containing compound, the fluorine-containing compound can precipitate alone as aluminum trifluoride.

Catalyst Systems

Catalyst systems employed n the practice of this invention comprise a fluorided, predominately gamma-alumina support, prepared as described above, and a transition metal compound, such as chromium. Other suitable, but less preferred, transition metal compounds are vanadium and titanium compounds. It should be recognized, however, that catalyst systems of the invention can be used in conjunction with additional polymerization components which do not adversely affect the catalyst performance, such as a cocatalyst.

The transition metal compound can be introduced anytime prior to activation of the catalyst system. Where the transition metal compound is chromium, the chromium compound can be any chromium compound in, or convertible to, the hexavalent state. The catalyst system contains chromium in an amount generally within the range of about 0.001 to about 10, preferably about 0.1 to about 5, more preferably about 1 weight percent, based on the weight of the dried, fluorided alumina support, to provide a catalyst with a high activity.

Catalyst system concentrations in a polymerization reactor can be such that the supported catalyst system content ranges from 0.001 to about 1 weight percent based on the weight of the reactor contents.

The chromium compound can be incorporated in any of several known in the art. One method to incorporate a chromium compound is to use an aqueous solution of a water-soluble chromium compound which is convertible to chromium oxide upon calcination. Examples of water-soluble chromium compounds include, but are not limited to, chromium acetate and chromium nitrate which precipitate out with the alumina. Chromium trioxide and other Cr(+6) compounds can also be used, but are less preferred because they are too soluble and tend to drain off with the excess water.

Chromium compounds can also be incorporated anhydrously into the alumina. A hydrocarbon solution of a chromium compound convertible to chromium oxide can be used to impregnate the alumina. Examples of such materials include, but are not limited to, tert-butyl chromate and chromium acetylacetonate. Suitable solvents include, but are not limited to, alcohols, pentanes, hexanes, and/or benzenes. Preferably, anhydrous chromium impregnation is used to maintain the integrity of the pre-calcined, fluorided, gamma-alumina support.

Calcination can take place by heating the chromium-impregnated fluorided alumina in the presence of an excess of molecular oxygen at a temperature within the range of about 300° to about 800° C., preferably about 300° to about 600° for about 30 minutes to about 50 hours, more preferably for about 0.5 to about 10 hours. At least a substantial portion of the chromium in low valence state is converted to the hexavalent form. Preferably, activation is carried out in a stream of fluidizing air which is continued as the material is cooled.

Polymerization

The catalysts of this invention can be used to polymerize at least one mono-1-olefin containing about 2 to about 8 carbon atoms per molecule, preferably ethylene, propylene, 1-butene, 1-pentene, 1-hexene, 4-methyl-1-pentene, 1-octene, and mixtures thereof. The invention is of particular applicability in producing ethylene homopolymers and copolymers from mixtures of ethylene and 0.5 to 20 mole percent of one or more comonomers selected from 1-olefins containing 3 to 8 carbon atoms per molecule. Exemplary comonomers include aliphatic 1-olefins, such as propylene, 1-butene, 1-pentene, 1-hexene, 4-methyl-1-pentene, 1-octene and other higher olefins and conjugated or non-conjugated diolefins such as 1,3-butadiene, 1,4-pentadiene, 1,5-hexadiene, and other such diolefins, and mixtures thereof. Ethylene copolymers preferably constitute at least about 90, preferably 97 to 99.8 mole percent polymerized ethylene units. With ethylene/hexene copolymers, about 98 to 99.8 mole percent ethylene is preferred, the remainder of course being the comonomer. Propylene, 1-butene, 1-pentene, 1-hexene and 1-octene are especially preferred comonomers for use with ethylene.

The polymers can be prepared from the catalyst of this invention by solution polymerization, slurry polymerization, gas phase polymerization, or other polymerization techniques using conventional equipment and contacting processes. Contacting of the monomer or monomers with the catalyst can be effected by any manner known in the art of solid catalysts. One convenient method is to suspend the catalyst in the organic medium and to agitate the mixture to maintain the catalyst in suspension throughout the polymerization process. Other known contacting methods such as fluidized bed, gravitating bed, and fixed bed can also be employed. Reference to the production of ethylene polymers in a particle form process is disclosed in U.S. Pat. No. 3,624,603 which issued Nov. 30, 1971 to Witt, the disclosure of which is hereby incorporated by reference.

Catalysts of this invention are particularly suitable for use in slurry polymerizations. The slurry, or particle form, process is generally carried out in an inert diluent (medium) such as paraffin, cycloparaffin or aromatic hydrocarbon. For predominantly ethylene polymers, a temperature of about 66° to about 110° C. is employed. Pressures in the particle form process can vary from about 110 to about 700 psia (0.65–4.8 MPa) or higher. The catalyst is kept in suspension and is contacted with the monomer or monomers at sufficient pressure to maintain the medium and at least a portion of the monomer or monomers in the liquid phase. The medium and temperature are thus selected such that the polymer is produced as solid particles and is recovered in that form. Catalyst concentrations can be such that the catalyst content ranges from 0.001 to about 1 weight percent based on the weight of the reactor contents.

Hydrogen can be used to control molecular weight, as is known in the prior art. When used, it is generally used at concentrations up to about 2 mole percent of reaction mixture, preferably within the range of about 0.1 to about 1 mole percent of reaction mixture.

Cocatalyst, to enhance the polymerization reaction, can be used as is known in the prior art. Examples of cocatalysts include, but are not limited to, triethylborane, diethylaluminum ethoxide, triethylaluminum, ethylaluminum sesquichloride, and mixtures thereof. When used, a cocatalyst is usually present at concentrations up to about 15 mole percent of reaction mixture, preferably within the range of about 0.1 to about 12 mole percent of the reaction mixture.

EXAMPLES

Examples I, II, and III pertain to the first embodiment of the invention, wherein the support comprises an anhydrous solution of a fluorine-containing compound impregnated onto gamma-alumina. Example IV pertains to the second embodiment of the invention wherein, the support comprises a fluorine-containing compound impregnated onto boehmite alumina precipitated in gamma-alumina. Example V shows the third embodiment of the invention wherein the support comprises a cogel of aluminum trifluoride and aluminum hydroxide, $AlF_3 \cdot xAl_2O_3$. In all Examples, ambient temperature and ambient pressure were used, unless otherwise indicated. The surrounding atmosphere was air, unless otherwise indicated.

Polymerization tests were carried out in a two-liter stirred autoclave. Typically about 0.05 to 0.10 gm of activated catalyst was charged to the reactor under nitrogen, then one liter (about 600 grams) of isobutane liquid diluent was added, and finally ethylene was supplied on demand to maintain a fixed pressure of 550 psig. Polymerization occurred at 95° C. At the end of each run, the isobutane and ethylene were flashed off, leaving a dry polymer powder. Each run was terminated by stopping the ethylene flow and venting the gaseous reactor contents to a flare line for disposal. The polymer was recovered, dried and weighed to determine catalyst productivity which is expressed in terms of grams polyethylene per gram catalyst.

Catalyst support surface areas were determined on 35-140 mesh samples using the standard nitrogen sorption BET method. Catalyst support pore volumes were measured by alcohol adsorption according to the Journal of Colloid and Interface Science, Vol. 78, No. 1.

EXAMPLE I

The following Runs show a minor improvement in activity which can be achieved by conventional fluoriding, at low levels, of uncalcined alumina. Both water and alcohol were used. Ammonium bifluoride ($NH_4HF_2$), ACS reagent grade, dissolved in methanol, ACS reagent grade, or deionized water, was impregnated onto virgin, i.e., untreated or unheated, Ketjen L alumina, commercially available from ARMAK Corporation. The weight percent of $NH_4HF_2$ present in the catalyst support is based on the weight of the Ketjen L alumina immediately prior to the addition of $NH_4HF_2$. The fluorine-containing alumina, i.e., catalyst support, was then dried and impregnated with chromium nitrate, ACS reagent grade, in methanol to equal 2 weight percent chromium, based on the weight of dried catalyst support. Then, the chromium impregnated support was activated in dry air at 500° C. to form a catalyst system. The results are given in Table II.

TABLE II

| Run | Solvent | Weight % $NH_4HF_2$ | Support Surface Area, m²/g | Productivity, g/polymer/g catalyst/30 mins |
|---|---|---|---|---|
| 101 | Water | 0 | 394 | 31 |
| 102 | " | 1 | 361 | 66 |
| 103 | " | 2 | 397 | 119 |
| 104 | " | 3 | 382 | 140 |
| 105 | " | 4 | 400 | 181 |
| 106 | " | 5 | 346 | 188 |
| 107 | Methanol | 0 | 406 | 50 |
| 108 | " | 3 | 391 | 89 |
| 109 | " | 5 | 381 | 201 |

EXAMPLE II

The following Runs demonstrate the need for the base alumina to be calcined first. Again, Ketjen L alumina was used, but with and without calcining at 600° C. for one hour, prior to introduction of ammonium bifluoride ($NH_4HF_2$), to convert the boehmite alumina to gamma-alumina. The $NH_4HF_2$ solvent was methanol. The weight percent of $NH_4HF_2$ present in the catalyst support is based on the weight of the Ketjen L alumina immediately prior to the addition of $NH_4HF_2$. The data in Table III are for supports wherein the base alumina was not pre-calcined. The data in Table IV are for supports wherein the base alumina was pre-calcined at 600° C. for one hour prior to contacting $NH_4HF_2$.

The fluorine-containing alumina, i.e., catalyst support after drying or calcining, was then impregnated with chromium nitrate, ACS reagent grade, in methanol to equal 2 weight percent chromium, based on the weight of dried catalyst support. Then, the chromium impregnated support was activated in dry air at 500° C. or 750° C., to form a catalyst system. The results are given in Tables III and IV.

TABLE III

| Run | Weight % $NH_4HF_2$ | Activation Temperature, °C. | Support Surface Area, m²/g | Productivity, g polymer/g catalyst/30 mins |
|---|---|---|---|---|
| 201 | 0 | 500 | 406 | 50 |
| 202 | 3 | 500 | 391 | 89 |
| 203 | 5 | 500 | 381 | 201 |
| 204 | 0 | 750 | 367 | 477 |
| 205 | 3 | 750 | 313 | 433 |
| 206 | 5 | 750 | 267 | 306 |

TABLE IV

| Run | Weight % $NH_4HF_2$ | Activation Temperature, °C. | Support Surface Area, m²/g | Productivity, g/polymer/g catalyst/30 mins |
|---|---|---|---|---|
| 210 | 0 | 500 | 331 | 240 |
| 211 | 1 | 500 | 326 | 272 |
| 212 | 3 | 500 | 315 | 516 |
| 213 | 5 | 500 | 292 | 877 |
| 214 | 0 | 750 | 322 | 727 |
| 215 | 1 | 750 | 306 | 645 |
| 216 | 3 | 750 | 294 | 948 |
| 217 | 5 | 750 | 260 | 256 |

EXAMPLE III

Table V shows the advantages of using higher fluoride loadings, i.e., greater than 5 weight percent $NH_4NF_2$ based on the weight of the calcined alumina, and of using lower activation temperatures. The catalyst systems were prepared as described in Example II, wherein the Ketjen L alumina was calcined at 600° C. for one hour prior to the introduction of $NH_4HF_2$.

TABLE V

| Run | Weight % $NH_4HF_2$ | Activation Temp. | Support Surface Area, m²/g | Productivity, g polymer/g catalyst/30 mins |
|---|---|---|---|---|
| 301 | 6 | 500 | 309 | 1537 |
| 302 | 7 | 500 | 315 | 1140 |
| 303 | 8 | 500 | 281 | 1315 |
| 304 | 10 | 500 | 264 | 1180 |
| 305 | 12 | 500 | 273 | 1344 |
| 306 | 14 | 500 | 257 | 949 |
| 307 | 16 | 500 | 261 | 1134 |
| 308 | 5 | 750 | 260 | 256 |
| 309 | 6 | 600 | 303 | 1200 |
| 310 | 12 | 600 | 279 | 764 |
| 311 | 14 | 600 | 263 | 583 |
| 312 | 8 | 400 | 276 | 740 |
| 313 | 10 | 400 | 275 | 805 |
| 314 | 12 | 400 | 275 | 1053 |
| 315 | 14 | 400 | 266 | 370 |
| 316 | 16 | 400 | 274 | 216 |

EXAMPLE IV

Sufficient amounts of an aqueous aluminum nitrate solution, in order to obtain from 3 to 10 weight percent aluminum, based on the weight of the calcined Ketjen L, was impregnated onto Ketjen L alumina. The Ketjen L alumina was precalcined at 700° C. for one hour. Impregnation with an aqueous aluminum nitrate solution was stopped just short of incipient wetness. Ammonium hydroxide was added to cause precipitation of aluminum hydroxide, i.e., "soft" alumina, inside the pores of the "hard" gamma-alumina, i.e., the pre-calcined Ketjen L alumina. The resultant boehmite alumina in gamma-alumina material was washed with water to be free of nitrate and excess ammonium hydroxide, then aged in water at 80° C. for one hour. The solid was filtered and then washed once with methanol, and finally dried at 80° C. in a vacuum oven overnight.

Then, a sufficient amount of ammonium bifluoride in a methanol solution, in order to obtain from 4 to 12 weight percent NH$_4$HF$_2$, based on the weight of the alumina-in-gamma-alumina support, was added to the alumina-in-gamma-alumina. The catalyst support was dried again in a vacuum oven at 80° C. for hours, and finally chromium nitrate in methanol was added to equal 2 weight percent chromium, based on the weight of the dried, fluorided alumina-in-gamma-alumina support. Activation occurred in dry air at 500° C. for 3 hours.

TABLE VI

| Run | Weight % "soft" aluminum | Weight % NH$_4$HF$_2$ | Support Surface Area, m$^2$/g | Productivity, g/polymer/g catalyst/30 mins |
|---|---|---|---|---|
| 401 | 3 | 4 | 385 | 1264 |
| 402 | 3 | 8 | 339 | 1555 |
| 403 | 3 | 12 | 303 | 3260 |
| 404 | 3 | 12 | 397 | 2325 |
| 405 | 6 | 12 | 300 | 2170 |
| 406 | 10 | 12 | 312 | 1467 |

Comparison of these activity numbers with the Runs in Tables IV and V show that, although the initial support preparation materials of the second embodiment are similar to those of the first embodiment, the support preparation procedure of the second embodiment yields a far more active catalyst system.

Example V

A cogel of AlF$_3$ and alumina, aluminum-oxy-fluoride (AlF$_3$.xAl$_2$O$_3$), containing greater than 10% by weight, AlF$_3$, based on the weight of the total support, was prepared. In the following Runs, varying amounts of NH$_4$HF$_2$ was dissolved in 250 mls NH$_4$OH and 250 mls water, and this solution was used to neutralize an aqueous aluminum nitrate (Al(NO$_3$)$_3$.9H$_2$O) solution (1000 g/l), yielding a co-precipitate of aluminum hydroxyfluoride. A co-precipitate was washed with water and filtered. A solid product was recovered, washed with n-propanol, and dried overnight at 80° C. in a vacuum oven. The weight percent of AlF$_3$, given in Table VII, is based on the weight of the total support, AlF$_3$.xAl$_2$O$_3$.

The catalyst support comprising fluorine-containing alumina, i.e., aluminum-oxy-fluoride (AlF$_3$.xAl$_2$O$_3$), after drying or calcining was then impregnated with chromium nitrate, ACS reagent grade, in methanol to equal 2 weight percent chromium, based on the weight of dried catalyst support. Then, the chromium impregnated support was activated in dry air at 450° C. or 500° C., to form a catalyst system. The results are given in Tables III and IV.

polymerization, providing a novel support previously unknown for this purpose.

While this invention has been described in detail for the purpose of illustration, it is not to be construed as limited thereby but is intended to cover all changes and modifications within the spirit and scope thereof.

That which is claimed is:

1. A process to prepare an alumina-in-gamma-alumina comprising the steps of:
   (a) calcining a large surface area alumina to form a calcined gamma-alumina;
   (b) impregnating the calcined gamma-alumina with a sufficient amount of a solution of an aluminum compound to be less than or equal to incipient wetness;
   (c) contacting (b) with an aluminum precipitating compound to form a precipitated alumina in the calcined gamma-alumina;
   (d) removing any residual unprecipitated ions or salts from the product of (c); and
   (e) drying the compound of (d) to form a composition comprising boehmite alumina-in-gamma-alumina.

2. A process according to claim 1 further comprising the step of contacting the boehmite alumina-in-gamma-alumina with a fluorine-containing compound.

3. A process according to claim 1 wherein the amount of said fluoriding agent is sufficient to incorporate from about 4 to about 14 weight percent fluorine onto the boehmite alumina-in-gamma-alumina, based on the weight of the boehmite alumina-in-gamma-alumina.

4. A process according to claim 1 wherein said large surface area alumina has a surface area within a range of about 200 to about 600 square meters per gram prior to contacting said fluoriding compound.

5. A process according to claim 4 wherein said large surface area alumina has a surface area within a range of about 250 to about 500 square meters per gram prior to contacting said fluoriding compound.

6. A process according to claim 2 wherein said fluoriding agent is selected from the group consisting of ammonium bifluoride (NH$_4$HF$_2$), ammonium fluoroborate (NH$_4$BF$_4$), ammonium silica fluoride ((NH$_4$)$_2$SiF$_6$), and mixtures thereof.

7. A process according to claim 2 further comprising and incorporating a chromium compound into the fluorided alumina.

8. A process according to claim 7 further comprising the step of heating the chromium impregnated fluorided alumina at a temperature within a range of about 300° to about 700° C. for a time within a range of about 1 to about 10 hours, in an oxidizing atmosphere.

9. A process according to claim 7 wherein the chromium impregnated fluorided alumina comprises chro-

TABLE VII

| Run | Weight % AlF$_3$* | F:Al Mole Ratio | Activation Temp., °C. | Support Surface Area, m$^2$/g | Support Pore Vol., cc/g | Productivity, g/polymer/g catalyst/30/mins |
|---|---|---|---|---|---|---|
| 501 | 30 | 0.63:1 | 450 | 177 | — | 244 |
| 502 | 50 | 1.15:1 | 450 | 116 | — | 305 |
| 503 | 15 | 0.30:1 | 450 | 309 | — | 100 |
| 504 | 30 | 0.63:1 | 500 | 141 | 1.3 | 191 |
| 505 | 50 | 1.15:1 | 500 | 77 | 0.8 | 102 |
| 506 | 15 | 0.30:1 | 500 | 256 | 1.0 | 613 |

*Calculated as AlF$_3$, based on total weight of AlF$_3$.xAl$_2$O$_3$.

Despite rather low porosity, the catalyst systems made from these gels still had some activity for ethylene mium within a range of about 0.1 to about 10 weight percent chromium, based on the weight of the dried fluorided alumina.

10. A composition prepared in accordance with the process of claim 1.

11. A catalyst system composition prepared in accordance with the process of claim 8.

12. A process to prepare a boehmite alumina-in-gamma-alumina comprising the steps of:
   a) calcining a large surface area alumina having a surface area within a range of about 200 to about 600 square meters per gram to form a calcined gamma-alumina;
   b) impregnating the calcined gamma-alumina with a sufficient amount of a solution of an aluminum compound to be less than or equal to incipient wetness;
   c) contacting (b) with an aluminum precipitating compound to form a precipitated alumina in the calcined gamma-alumina;
   d) removing any residual unprecipitated ions or salts from the product of (c);
   e) drying the compound (d) to form a composition comprising boemite alumina-in-gamma-alumina; and
   contacting the boehmite alumina-in-gamma-alumina with a fluorine-containing compound selected from the group consisting of ammonium bifluoride ($NH_4HF_2$), ammonium fluoroborate ($NH_4BF_4$), ammonium silica fluoride (($NH_4)_2 SiF_6$) and mixtures thereof.

13. A process according to claim 12 when the amount of said fluoriding agent is sufficient to incorporate from about 4 to about 14 weight percent fluorine onto the boehmite alumina-in-gamma-alumina, based on the weight of the boehmite alumina-in-gamma-alumina.

14. A process according to claim 13 further comprising incorporating a chromium compound into the fluorided alumina.

15. A process according to claim 14 further comprising the step of heating the chromium impregnated fluorided alumina at a temperature within a range of about 300° to about 700° C., for a time within a range of about 1 to about 10 hours, in an oxidizing atmosphere.

16. A composition prepared in accordance with the process of claim 12.

17. A catalyst system composition prepared in accordance with the process of claim 15.

* * * * *